United States Patent
Kim et al.

(10) Patent No.: US 11,122,454 B2
(45) Date of Patent: Sep. 14, 2021

(54) MEASUREMENT PERFORMING METHOD AND USER EQUIPMENT

(71) Applicant: LG Electronics Inc., Seoul (KR)

(72) Inventors: Eunsun Kim, Seoul (KR); Hyunsoo Ko, Seoul (KR); Kijun Kim, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/484,013

(22) PCT Filed: Feb. 6, 2018

(86) PCT No.: PCT/KR2018/001544
§ 371 (c)(1),
(2) Date: Aug. 6, 2019

(87) PCT Pub. No.: WO2018/143760
PCT Pub. Date: Aug. 9, 2018

(65) Prior Publication Data
US 2020/0022010 A1 Jan. 16, 2020

Related U.S. Application Data

(60) Provisional application No. 62/501,107, filed on May 4, 2017, provisional application No. 62/481,606, filed (Continued)

(51) Int. Cl.
*H04L 12/24* (2006.01)
*H04B 7/06* (2006.01)
(Continued)

(52) U.S. Cl.
CPC ........... *H04W 24/10* (2013.01); *H04W 24/02* (2013.01)

(58) Field of Classification Search
CPC ..... H04W 24/10; H04W 24/08; H04W 16/14; H04W 24/02; H04W 88/08; H04L 5/00; (Continued)

(56) References Cited

U.S. PATENT DOCUMENTS 10,630,410 B2 * 4/2020 Parkvall ............... H04B 7/0452
2014/0362793 A1 * 12/2014 Chai ..................... H04W 24/10
370/329

(Continued)

OTHER PUBLICATIONS

LG Electronics, "Discussion on QCL for NR," R1-1700487, 3GPP TSG RAN WG1 NR Ad-Hoc Meeting, Spokane, USA, Jan. 16-20, 2017, 3 pages.

(Continued)

*Primary Examiner* — Edan Orgad
*Assistant Examiner* — Vanneilian Lalchinthang
(74) *Attorney, Agent, or Firm* — Fish & Richardson P.C.

(57) ABSTRACT

User equipment can be configured to perform a channel state information reference signal (CSI-RS)-based radio resource management (RRM) measurement. The user equipment receives CSI-RS configuration information, and receives a CSI-RS of a cell on the basis of the CSI-RS configuration information so as to perform a CSI-RS-based RRM measurement. The CSI-RS configuration information includes an SS block index for indicating an SS block associated with the CSI-RS, and the user equipment receives the CSI-RS on the basis of the SS block index.

8 Claims, 6 Drawing Sheets

Related U.S. Application Data on Apr. 4, 2017, provisional application No. 62/475,978, filed on Mar. 24, 2017, provisional application No. 62/454,961, filed on Feb. 6, 2017.

(51) Int. Cl.
  *H04W 24/10* (2009.01)
  *H04W 24/02* (2009.01)

(58) Field of Classification Search
  CPC ............ H04L 41/0866; H04L 27/2613; H04B 7/0695
  USPC .......................................................... 370/252
  See application file for complete search history.

(56) References Cited

U.S. PATENT DOCUMENTS

| | | | | |
|---|---|---|---|---|
| 2015/0195731 | A1* | 7/2015 | Jung | H04L 5/0048 370/252 |
| 2016/0013984 | A1* | 1/2016 | Sun | H04L 41/0866 370/252 |
| 2016/0165458 | A1* | 6/2016 | Peng | H04B 7/0413 370/329 |
| 2018/0091212 | A1* | 3/2018 | Lee | H04B 7/0695 |
| 2018/0205585 | A1* | 7/2018 | Sadiq | H04L 27/2613 |
| 2019/0268056 | A1* | 8/2019 | Wang | H04B 7/0695 |
| 2019/0288765 | A1* | 9/2019 | Lee | H04L 5/0048 |

OTHER PUBLICATIONS

ZTE, ZTE Microelectronics, "Considerations on SS block design," R1-1611268, 3GPP TSG RAN WG1 Meeting #87, Reno, USA, Nov. 14-18, 2016, 7 pages.

Samsung, "Discussion on SS block/bust/burst set for the multi-beam case," R1-1612450, 3GPP TSG RAN WG1 Meeting #87, Reno, USA, Nov. 14-18, 2016, 3 pages.

PCT International Search Report and Written Opinion in International Application No. PCT/KR2018/001544, dated May 8, 2018, 24 pages (with English translation).

* cited by examiner

MEASUREMENT PERFORMING METHOD AND USER EQUIPMENT

CROSS-REFERENCE TO RELATED APPLICATIONS

This application is a National Stage application under 35 U.S.C. § 371 of International Application No. PCT/KR2018/001544, filed on Feb. 6, 2018, which claims the benefit of U.S. Provisional Application No. 62/501,107, filed on May 4, 2017, U.S. Provisional Application No. 62/481,606, filed on Apr. 4, 2017, U.S. Provisional Application No. 62/475,978, filed on Mar. 24, 2017, and U.S. Provisional Application No. 62/454,961, filed on Feb. 6, 2017. The disclosures of the prior applications are incorporated by reference in their entirety.

TECHNICAL FIELD

The present invention relates to a wireless communication system. Particularly, the present invention relates to a method and apparatus for performing measurement.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services anytime and anywhere by connecting a plurality of devices and objects to each other is one main issue to be considered in future-generation communication.

Further, a communication system to be designed in consideration of services/UEs sensitive to reliability and latency is under discussion. The introduction of future-generation RAT has been discussed by taking into consideration eMBB communication, mMTC, ultra-reliable and low-latency communication (URLLC), and the like.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

In addition, with development of smart devices, a new method of efficiently transmitting/receiving small volumes of data or efficiently transmitting/receiving less frequently generated data is needed.

In addition, a signal transmission/reception method is required in the system supporting new radio access technologies.

The technical objects that can be achieved through the present invention are not limited to what has been particularly described hereinabove and other technical objects not described herein will be more clearly understood by persons skilled in the art from the following detailed description.

Technical Solution

According to an aspect of the present invention, provided herein is a method of performing measurement by a user equipment (UE) in a wireless communication system. The method includes: receiving channel state information reference signal (CSI-RS) configuration information; and receiving a CSI-RS of a cell based on the CSI-RS configuration information to perform CSI-RS based radio resource management (RRM) measurement. The CSI-RS configuration information may include a synchronization signal (SS) block index indicating an SS block associated with the CSI-RS. The UE may receive the CSI-RS based on the SS block index.

In another aspect of the present invention, provided herein is a user equipment (UE) for performing measurement in a wireless communication system. The UE includes a radio frequency (RF) unit, and a processor configured to control the RF unit. The processor is configured to: control the RF unit to receive measurement configuration information based on a channel state information reference signal (CSI-RS); and perform CSI-RS based radio resource management (RRM) measurement using the CSI-RS. The measurement configuration information may include a synchronization signal (SS) block index indicating an SS block associated with the CSI-RS. The processor may control the RF unit to receive the CSI-RS based on the SS block index.

In each aspect of the present invention, the UE may acquire synchronization information of the CSI-RS based on the SS block index. The UE may receive the CSI-RS according to the synchronization information.

In each aspect of the present invention, the UE may report a result of the CSI-RS based RRM measurement.

In each aspect of the present invention, the cell may be a serving cell or a neighboring cell of the UE.

In each aspect of the present invention, if a specific SS block transmitted by a non-serving cell is detected and if a measurement value for the specific SS block is equal to or greater than a predetermined value, the UE may transmit a CSI-RS information request for the non-serving cell. The CSI-RS configuration information may be received as a response to the CS-RS information request.

In each aspect of the present invention, if the CSI-RS based RRM measurement is interference measurement, the UE may measure the CSI-RS while matching a received beam of the UE to a serving CSI-RS or a serving SS block of the UE.

The above technical solutions are merely some parts of the embodiments of the present invention and various embodiments into which the technical features of the present invention are incorporated can be derived and understood by persons skilled in the art from the following detailed description of the present invention.

Advantageous Effects

According to an embodiment of the present invention, a radio communication signal can be efficiently transmitted/received. Therefore, the total throughput of a wireless communication system can be raised.

According to an embodiment of the present invention, delay/latency occurring in a communication process between a UE and a BS can be lowered.

With development of smart devices, small volumes of data can be efficiently transmitted/received or less frequently generated data can be efficiently transmitted/received.

In addition, signals can be transmitted/received in a system supporting new radio access technologies.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

MODE FOR CARRYING OUT THE INVENTION

Figure 1:
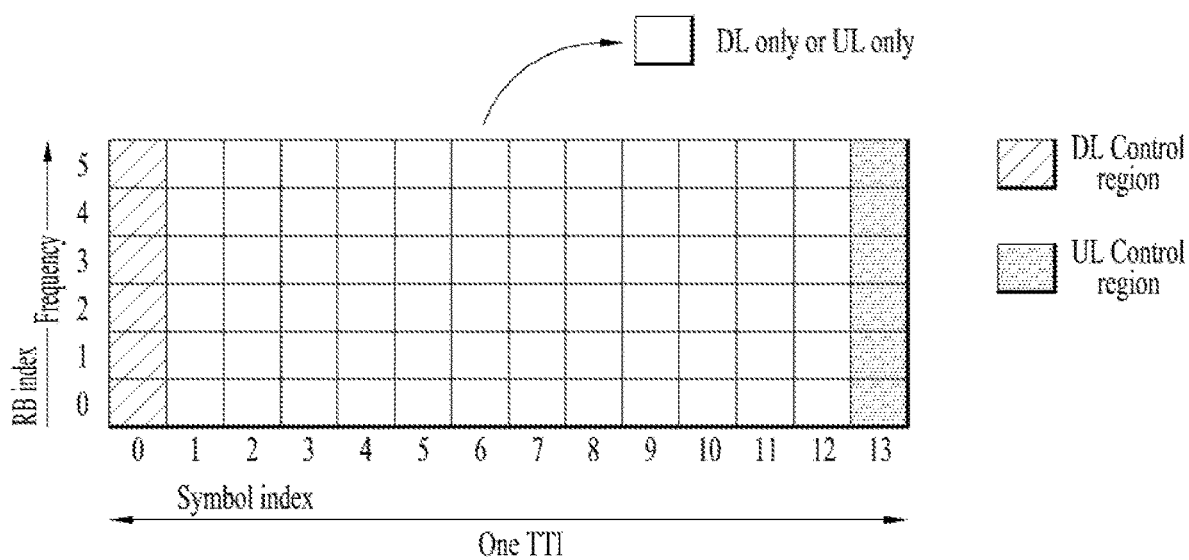
FIG. 1 illustrates a subframe structure available in a new radio access technology (NR).

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP based communication system, e.g. LTE/LTE-A, NR. However, the technical features of the present invention are not limited thereto. For example, although the following detailed description is given based on a mobile communication system corresponding to a 3GPP LTE/LTE-A/NR system, aspects of the present invention that are not specific to 3GPP LTE/LTE-A/NR are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In embodiments of the present invention described below, the term "assume" may mean that a subject to transmit a channel transmits the channel in accordance with the corresponding "assumption". This may also mean that a subject to receive the channel receives or decodes the channel in a form conforming to the "assumption", on the assumption that the channel has been transmitted according to the "assumption".

In the present invention, puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Particularly, a BS of a UTRAN is referred to as a Node-B, a BS of an E-UTRAN is referred to as an eNB, and a BS of a new radio access technology network is referred to as a gNB. In describing the present invention, a BS will be referred to as a gNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. In the 3GPP based communication system, the UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node.

Meanwhile, a 3GPP based communication system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP communication standards use the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

3GPP based communication standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both an eNB and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast ssubframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For terms and technologies which are not described in detail in the present invention, reference can be made to the standard document of 3GPP LTE/LTE-A, for example, 3GPP TS 36.211, 3GPP TS 36.212, 3GPP TS 36.213, 3GPP TS 36.321, and 3GPP TS 36.331 and the standard document of 3GPP NR, for example, 3GPP TS 38.211, 3GPP TS 38.212, 3GPP 38.213, 3GPP 38.214, 3GPP 38.215, and 3GPP TS 36.331.

As more communication devices have demanded higher communication capacity, there has been necessity of enhanced mobile broadband relative to legacy radio access technology (RAT). In addition, massive machine type communication for providing various services irrespective of time and place by connecting a plurality of devices and objects to each other is one main issue to be considered in future-generation communication. Further, a communication system design in which services/UEs sensitive to reliability and latency are considered is under discussion. The introduction of future-generation RAT has been discussed by taking into consideration enhanced mobile broadband communication, massive MTC, ultra-reliable and low-latency communication (URLLC), and the like. In current 3GPP, a study of the future-generation mobile communication system after EPC is being conducted. In the present invention, the corresponding technology is referred to as a new RAT (NR) or 5G RAT, for convenience.

An NR communication system demands that much better performance than a legacy fourth generation (4G) system be supported in terms of data rate, capacity, latency, energy consumption, and cost. Accordingly, the NR system needs to make progress in terms of bandwidth, spectrum, energy, signaling efficiency, and cost per bit.

<OFDM Numerology>

The new RAT system uses an OFDM transmission scheme or a similar transmission scheme. For example, the new RAT system may follow the OFDM parameters defined in the following table. The new RAT system may conform to numerology of the legacy LTE/LTE-A system but may have a broader system bandwidth (e.g., 100 MHz) than the legacy LTE/LTE-A system. One cell may support a plurality of numerologies. That is, UEs that operate with different numerologies may coexist within one cell.

<Subframe Structure>

FIG. 1 illustrates a subframe structure available in a new radio access technology (NR).

To minimize data transmission latency, in a 5G new RAT, a subframe structure in which a control channel and a data channel are time-division-multiplexed is considered.

In FIG. 1, the hatched area represents the transmission region of a DL control channel (e.g., PDCCH) carrying the DCI, and the black area represents the transmission region of a UL control channel (e.g., PUCCH) carrying the UCI. Here, the DCI is control information that the eNB transmits to the UE. The DCI may include information on cell configuration that the UE should know, DL specific information such as DL scheduling, and UL specific information such as UL grant. The UCI is control information that the UE transmits to the eNB. The UCI may include a HARQ ACK/NACK report on the DL data, a CSI report on the DL channel status, and a scheduling request (SR).

In FIG. 1, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the subframe structure, DL transmission and UL transmission may be sequentially performed in one subframe, and thus transmission/reception of DL data and reception/transmission of UL ACK/NACK for the DL data may be performed in one subframe. As a result, the time taken to retransmit data when a data transmission error occurs may be reduced, thereby minimizing the latency of final data transmission.

In such a subframe structure, a time gap is needed for the process of switching from the transmission mode to the reception mode or from the reception mode to the transmission mode of the eNB and UE. On behalf of the process of switching between the transmission mode and the reception mode, some OFDM symbols at the time of switching from DL to UL in the subframe structure are set as a guard period (GP).

In the legacy LTE/LTE-A system, a DL control channel is time-division-multiplexed with a data channel and a PDCCH, which is a control channel, is transmitted throughout an entire system band. However, in the new RAT, it is expected that a bandwidth of one system reaches approximately a minimum of 100 MHz and it is difficult to distribute the control channel throughout the entire band for transmission of the control channel. For data transmission/reception of a UE, if the entire band is monitored to receive the DL control channel, this may cause increase in battery consumption of the UE and deterioration in efficiency. Accordingly, in the present invention, the DL control channel may be locally transmitted or distributively transmitted in a partial frequency band in a system band, i.e., a channel band.

<Analog Beamforming>

In the millimeter wave (mmW), the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of 0.5λ (wavelength). Therefore, in mmW, increasing the coverage or the throughput by increasing the beamforming (BF) gain using multiple antenna elements is taken into consideration.

If a transceiver unit (TXRU) is provided for each antenna element to enable adjustment of transmit power and phase, independent beamforming is possible for each frequency resource. However, installing TXRU in all of the about 100 antenna elements is less feasible in terms of cost. Therefore, the analog beamforming method is in consideration. In the analog beamforming method, multiple antenna elements are mapped to one TXRU and a beam direction is adjusted using an analog phase shifter. This analog beamforming method may only make one beam direction in the whole band, and thus may not perform frequency selective beamforming (BF), which is disadvantageous.

The hybrid BF method may be considered. The hybrid BF method is an intermediate type of digital BF and analog BF and uses B TXRUs less in number than Q antenna elements. In the case of hybrid BF, the number of directions in which beams may be transmitted at the same time is limited to B or less, which depends on the method of collection of B TXRUs and Q antenna elements.

<Hybrid Analog Beamforming>

Figure 2:
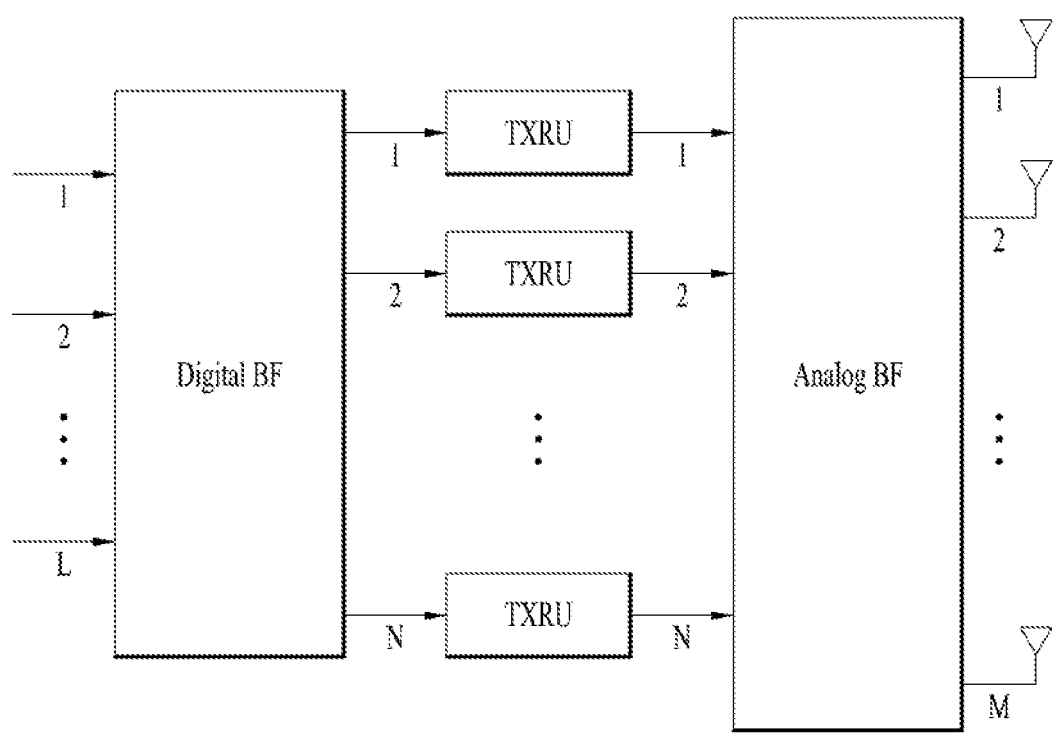
FIG. 2 abstractly illustrates transceiver units (TXRUs) and a hybrid beamforming structure in terms of physical antennas.

FIG. 2 abstractly illustrates TXRUs and a hybrid BF structure in terms of physical antennas.

When a plurality of antennas is used, a hybrid BF method in which digital BF and analog BF are combined is considered. Analog BF (or RF BF) refers to an operation in which an RF unit performs precoding (or combining). In hybrid BF, each of a baseband unit and the RF unit (also referred to as a transceiver) performs precoding (or combining) so that performance approximating to digital BF can be obtained while the number of RF chains and the number of digital-to-analog (D/A) (or analog-to-digital (A/D)) converters is reduced. For convenience, the hybrid BF structure may be expressed as N TXRUs and M physical antennas. Digital BF for L data layers to be transmitted by a transmitter may be expressed as an N-by-L matrix. Next, N converted digital signals are converted into analog signals through the TXRUs and analog BF expressed as an M-by-N matrix is applied to the analog signals. In FIG. 2, the number of digital beams is L and the number of analog beams is N. In the NR system, the BS is designed so as to change analog BF in units of symbols and efficient BF support for a UE located in a specific region is considered. If the N TXRUs and the M RF antennas are defined as one antenna panel, the NR system considers even a method of introducing plural antenna panels to which independent hybrid BF is applicable. In this way, when the BS uses a plurality of analog beams, since which analog beam is favorable for signal reception may differ according to each UE, a beam sweeping operation is considered so that, for at least a synchronization signal, system information, and paging, all UEs may have reception opportunities by changing a plurality of analog beams, that the BS is to apply, according to symbols in a specific subframe.

Figure 3:
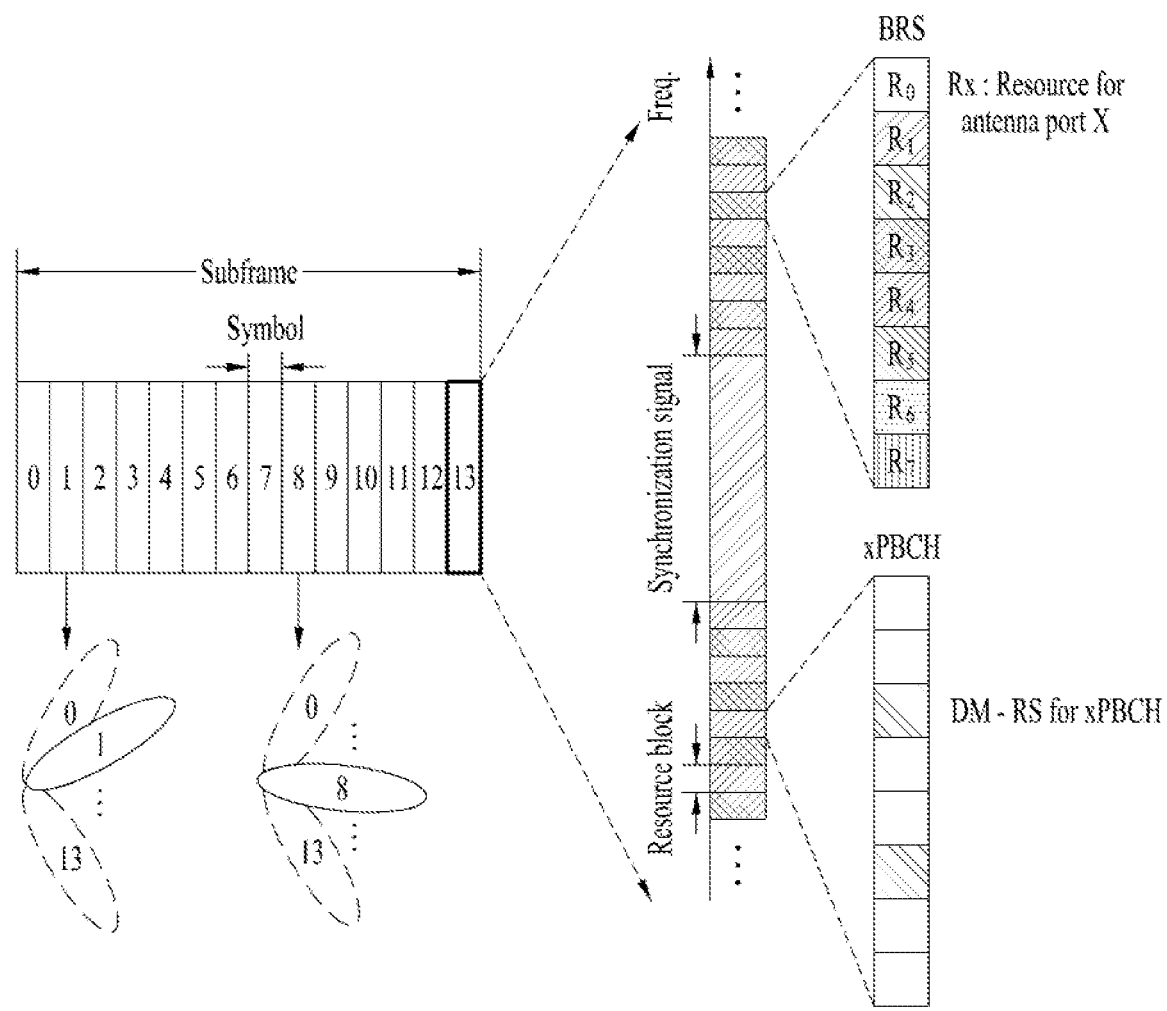
FIG. 3 illustrates a beam sweeping operation for a synchronization signal and system information in a downlink (DL) transmission procedure.

FIG. 3 illustrates a beam sweeping operation for a synchronization signal and system information in a downlink (DL) transmission procedure. In FIG. 3, a physical resource (or a physical channel) on which the system information of the NR system is transmitted in a broadcasting manner is referred to as an xPBCH. In this case, analog beams belonging to different antenna panels may be simultaneously transmitted within one symbol. In order to measure a channel for each analog beam, a method of introducing a beam reference signal (BRS), which is a reference signal (RS) transmitted by applying a single analog beam (corresponding to a specific antenna panel) as illustrated in FIG. 3, is being discussed. The BRS may be defined for a plurality of antenna ports and each antenna port of the BRS may correspond to a single analog beam. Unlike the BRS, the synchronization signal or xPBCH may be transmitted by applying all analog beams in an analog beam group thereto so that any UE may receive the synchronization signal or xPBCH well.

<Radio Resource Management (RRM) Measurements>

The LTE/LTE-A system supports an RRM operation including power control, scheduling, cell search, cell re-selection, handover, radio link or connection monitoring, connection establishment/re-establishment, and the like. In this case, a serving cell may request that the UE transmit RRM measurement information, which is a measurement value for performing the RRM operation. Typically, in the LTE/LTE-A system, the UE may measure cell search information, reference signal received power (RSRP), and reference signal received quality (RSRQ) of each cell and report the same. Specifically, in the LTE/LTE-A system, the UE receives measConfig as a higher-layer signal for RRM measurement from the serving cell. The UE measures RSRP or RSRQ according to information of measConfig. RSRP, RSRQ, and a received signal strength indicator (RSSI) according to 3GPP TS 36.214, which is the standard specification of the LTE/LTE-A system, are defined as follows.

RSRP

Reference signal received power (RSRP), is defined as the linear average over the power contributions (in [W]) of the resource elements that carry cell-specific reference signals within the considered measurement frequency bandwidth. For RSRP determination the cell-specific reference signals R0 according to 3GPP TS 36.211 shall be used. If the UE can reliably detect that R1 is available it may use R1 in addition to R0 to determine RSRP. The reference point for the RSRP shall be the antenna connector of the UE. If receiver diversity is in use by the UE, the reported value shall not be lower than the corresponding RSRP of any of the individual diversity branches.

RSRQ

Reference Signal Received Quality (RSRQ) is defined as the ratio N*RSRP/(E-UTRA carrier RSSI), where N is the number of resource blocks (RBs) of the E-UTRA carrier RSSI measurement bandwidth. The measurements in the numerator and denominator shall be made over the same set of resource blocks. E-UTRA Carrier Received Signal Strength Indicator (RSSI), comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signaling indicates certain subframes for performing RSRQ measurements, then RSSI is measured over all OFDM symbols in the indicated subframes. The reference point for the RSRQ shall be the antenna connector of the UE. If receiver diversity is in use by the UE, the reported value shall not be lower than the corresponding RSRQ of any of the individual diversity branches.

RSSI

The received wide band power, including thermal noise and noise generated in the receiver, within the bandwidth defined by the receiver pulse shaping filter. The reference point for the measurement shall be the antenna connector of the UE. If receiver diversity is in use by the UE, the reported value shall not be lower than the corresponding UTRA carrier RSSI of any of the individual receive antenna branches.

According to the above definition, the UE operating in the LTE/LTE-A system may measure RSRP in a bandwidth corresponding to one of 6, 15, 25, 50, 75, and 100 RBs, based on an allowed measurement bandwidth related information element (IE) transmitted in system information block type 3 (SIB3) in the case of intra-frequency measurement and based on an allowed measurement bandwidth related IE transmitted in system information block type 5 (SIB5) in the case of inter-frequency measurement. Alternatively, in the absence of the IE, the UE may measure RSRP in all frequency bands of a DL system by default. Upon receiving information about an allowed measurement bandwidth, the UE may regard a corresponding value as a maximum measurement bandwidth and freely measure the value of RSRP within the corresponding value. However, if a serving cell transmits an IE defined as a wide band RSRQ (WB-RSRQ) and sets the allowed measurement bandwidth to 50 RBs or more, the UE needs to calculate the value of RSRP for a total allowed measurement bandwidth. Meanwhile, RS SI is measured in a frequency bandwidth of a receiver of the UE according to definition of an RS SI bandwidth.

RRM According to the Present Invention

The present invention proposes a method of performing DL measurement (for the purpose of cell selection) by the UE, when one cell includes one or more transmission and reception points (TRPs) in a wireless communication system including BS(s) and UE(s) and when each TRP may perform signal transmission in the directions of a plurality of analog beams according to a hybrid BF (or analog BF) scheme.

Recently, the 3GPP standardization organization is considering network slicing to achieve a plurality of logical networks in a single physical network in a new RAT system, i.e., an NR system, which is a 5G wireless communication system. The logical networks should be capable of supporting various services (e.g., eMBB, mMTC, URLLC, etc.) having various requirements. A physical layer system of the NR system considers a method supporting an orthogonal frequency division multiplexing (OFDM) scheme using variable numerologies according to various services. In other words, the NR system may consider the OFDM scheme (or multiple access scheme) using independent numerologies in each time and frequency resource region.

Recently, as data traffic remarkably increases with appearance of smart devices, the NR system is needed to support higher communication capacity (e.g., data throughput). One method considered to raise communication capacity is to transmit data using a plurality of transmission (or reception) antennas. If digital BF is desired to be applied to the multiple antennas, each antenna requires an RF chain (e.g., a chain consisting of RF elements such as a power amplifier and a down converter) and a digital-to-analog (D/A) or analog-to-digital (A/D) converter. This structure increases hardware complexity and consumes high power which may not be practical. Accordingly, when multiple antennas are used, the NR system considers the above-mentioned hybrid BF method in which digital BF and analog BF are combined.

Figure 4:
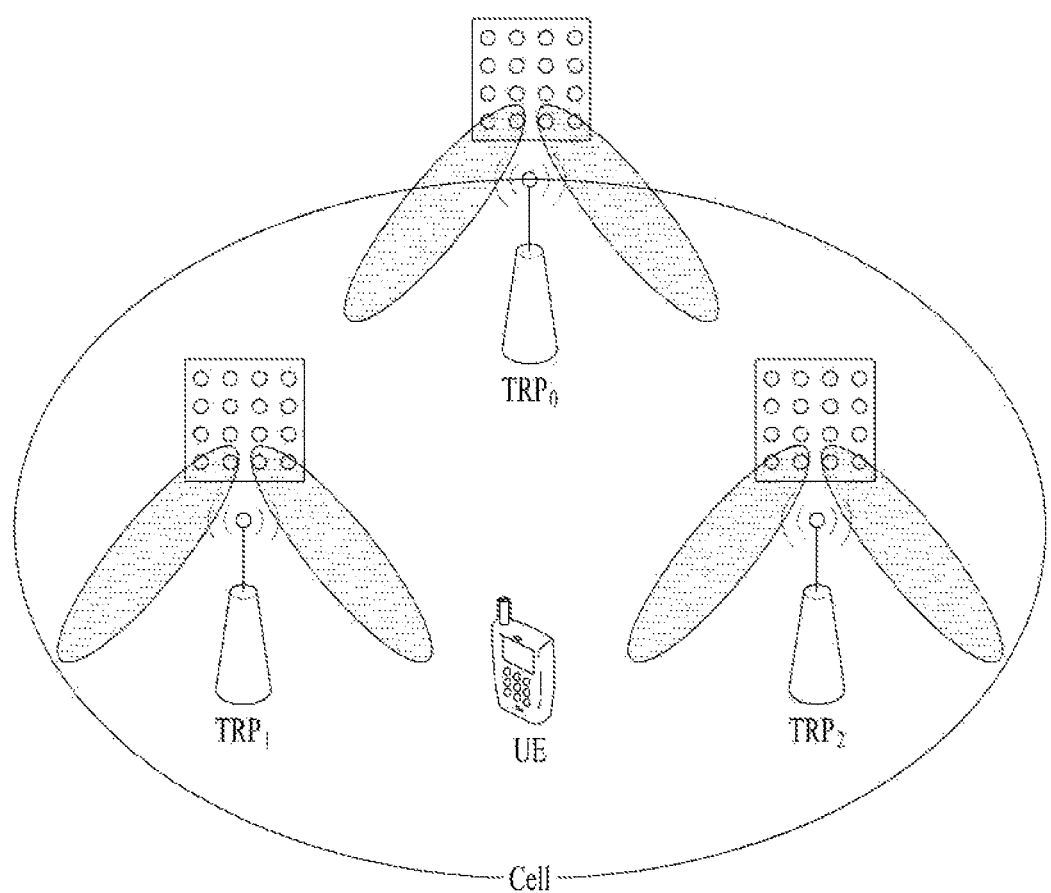
FIG. 4 illustrates a cell of a new radio access technology (NR) system.

FIG. 4 illustrates a cell of a new radio access technology (NR) system.

Referring to FIG. 4, in the NR system, a method in which a plurality of TRPs configures one cell is under discussion unlike a wireless communication system of legacy LTE in which one gNB forms one cell. If the plural TRPs configure one cell, seamless communication can be provided even when a TRP that provides a service to a UE is changed to another TRP so that mobility management of the UE is facilitated.

In the LTE/LTE-A system, PSS/SSS are transmitted omni-directionally. Meanwhile, a method is considered in which a gNB to which millimeter wave (mmWave) is applied transmits signals such as PSS/SSS/PBCH through BF while sweeping beam directions omnidirectionally. Transmission/reception of signals while sweeping beam directions is referred to as beam sweeping or beam scanning. For example, assuming that the gNB can have a maximum of N beam directions, the gNB transmits signals such as the PSS/SSS/PBCH in each of the N beam directions. That is, the gNB transmits synchronization signals such as the PSS/SSS/PBCH in each direction while sweeping directions that the gNB can have or the gNB desires to support. Alternatively, when the gNB can form N beams, one beam group may be configured by grouping a few beams and the PSS/SSS/PBCH may be transmitted/received with respect to each beam group. In this case, one beam group includes one or more beams. Signals such as the PSS/SSS/PBCH transmitted in the same direction may be defined as one synchronization signal (SS) block and a plurality of SS blocks may be present in one cell. When the plural SS blocks are present, SS block indexes may be used to distinguish between the SS blocks. For example, if the PSS/SSS/PBCH are transmitted in 10 beam directions in one system, the PSS/SSS/PBCH transmitted in the same direction may constitute one SS block and it may be understood that 10 SS blocks are present in the system. In the present invention, a beam index may be interpreted as an SS block index.

In a multi-beam environment, RRM is destined to cause the UE to measure a signal of a specific cell/beam so that the UE may select a cell/beam capable of providing the best service thereto. In an idle mode, the UE first detects a synchronization signal of a cell to acquire time-frequency synchronization for the cell and then measures a specific signal of the cell. The UE may perform measurement for a plurality of cells and select a cell having best quality to attempt to enter the cell. Alternatively, a network may hand over the UE to a specific cell. In NR, which is also called 5G, if the PSS/SSS/PBCH is transmitted through BF, it is difficult to simply specify cell-specific RRM unlike LTE because a plurality of SS blocks may be present within one cell.

Figure 5:
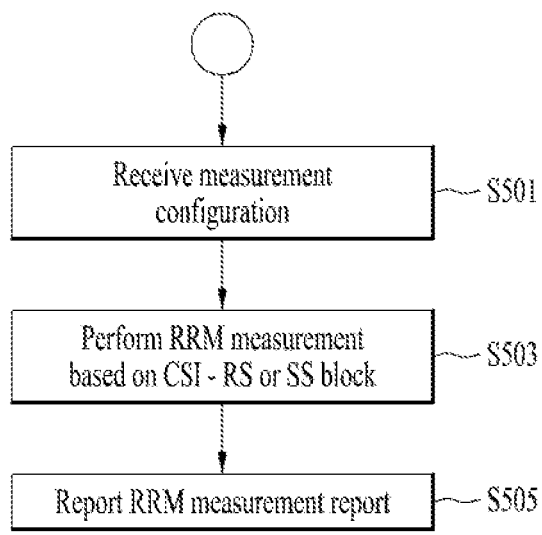
FIG. 5 schematically illustrates radio resource management (RRM) measurement process performed by a user equipment (UE) in the present invention.

FIG. 5 schematically illustrates RRM measurement process performed by a UE in the present invention.

The UE receives measurement configuration information from a network/gNB (S501), performs RRM measurement based on an SS block or a CSI-RS according to the measurement configuration information (S503), and reports a result of RRM measurement to the network/gNB (S505). Hereinafter, RRM measurement methods according to the present invention will be described in more detail.

RRM Measurement

Respective RRM measurement operations may be defined in IDLE mode, CONNECTED mode, and INACTIVE mode according to the state of the UE. According to agreements of 3GPP RAN1 up to now, an SSS transmitted per SS block is used for layer 3 (L3) mobility in IDLE mode. A plurality of SS blocks may be defined per cell and the UE measures/calculates SS block RSRP using an SSS in an SS block. In the present invention, the network may inform the UE in CONNECTED mode of a plurality of CSI-RSs in order to configure a finer beam than the SS block. A plurality of CSI-RSs may be configured per SS block. For L3 mobility in CONNECTED mode, the UE additionally uses CSI-RSs in addition to SSSs that have been used in IDLE mode.

Cell-Level RRM Quantity

In a multi-beam environment, when there is a plurality of RSs for RRM in one cell, one cell-level quantity needs to be derived/calculated for cell selection/reselection. This is called a cell-level RRM value. Cell selection/reselection of the UE/network is differently determined depending on how a corresponding cell-level RRM value is derived using a plurality of RRM values. There may be several schemes for calculating a cell-level RRM value using a plurality of RRM values for the same cell. For example:

1) the cell-level RRM is calculated by performing simple average or weighted average upon RRM values having a threshold or more, or
2) the cell-level RRM is calculated by performing simple average or weighted average upon best N RRM values having a threshold or more, or
3) the cell-level RRM is calculated by performing average on the time axis upon the best RRM value.

Hereinafter, a method of deriving the cell-level RRM value according to the method of 3) will be described. Hereinafter, "SS-block RSRP" may be interpreted as the same meaning as SSS RSRP. The UE may estimate a plurality of SS-block-RSRPs and needs to derive a cell-level measurement quantity using the SS-block-RSRPs for L3 mobility in IDLE mode. To derive the cell-level RRM quantity, timing averaging of the best received value of an SSS in each measurement instance is used as in the following equation. Herein, averaging does not mean averaging in the spatial domain (e.g., multiple SS blocks) in a given instance.

$$P_{avg} = \frac{1}{T}\sum_t \max_i P_i(t)$$ Equation 1

Herein, $P_{avg}$ is a cell-level RRM measurement value, NO is SS-block-RSRP, and T is an averaging window for measurement. The UE selects the best SS-block-RSRPs in respective measurement instances and averages the best SS-block-RSRPs over an averaging time window. In other words, the present invention proposes that the cell-level measurement quantity conforms to the best envelope among a plurality of SS-block-RSRPs so that the UE may determine the best serving cell. To derive a cell-level RRM value even for a plurality of CSI-RS RSRP values using a CSI-RS, a scheme similar to Equation 1 or the same scheme as Equation 1 may be used. When the CSI-RS is used to derive the cell-level RRM value, NO may be replaced with CSI-RS RSRP to use Equation 1.

<RSs for L3 Mobility>

The first purpose of RRM measurement may be cell selection/reselection. RRM measurement for cell selection/reselection may be referred to as L3 measurement or L3 mobility. The present invention proposes using the same RS for L3 mobility regardless of a variation in state of the UE. Basically, the UE acquires time/frequency synchronization using an SS block. A CSI-RS is allocated per cell and the UE acquires time/frequency synchronization of each cell using the SS block. Even when the UE performs RRM measurement using the CSI-RS, the UE acquires time/frequency synchronization using the SS block. For a specific CSI-RS, the UE may get help from the SS block in acquiring synchronization for space based on the specific CSI-RS. That is, in CONNECTED mode, the CSI-RS may be used for DL measurement in addition to an SSS. There may be a plurality of SS blocks for producing a plurality of SS block RSRPs and a plurality of CSI-RSs may be configured per SS block. While the UE is in CONNECTED mode, since the UE continues to track CSI-RS based RSRP as well as SS block RSRP, the relationship between the SS block RSRP and the CSI-RS based RSRP may be helpful to the UE.

The CSI-RS may be associated with the SS block. If the UE detects the SS block first and acquires time/frequency synchronization, time/frequency synchronization of the CSI-RS may be obtained from the SS block per cell. Assuming that the SS block is wider than the CSI-RS and a plurality of CSI-RSs is present within an SS block beam width, a part of spatial information may be obtained from the SS block. A set of CSI-RSs may be defined within a specific SS block beam width and this information is provided to UEs. On the other hand, if a transmission periodicity of the SS block is much longer than a transmission periodicity of the CSI-RS, the relationship between the CSI-RS and the SS block may not be helpful to the UE to acquire spatial information from the SS block. Therefore, if the transmission periodicity of the SS block is much longer than the transmission periodicity of the CSI-RS, the CSI-RS may not be associated with a specific SS block.

If a connection/association relationship is formed between the SS block and the CSI-RS so that the UE may get help from the SS block in acquiring a part of spatial synchronization from the SS block, the network transfers such information to the UE. For example, the network may provide the UE with an SS block index connected to/associated with each CSI-RS index. If such a connection relationship is not formed, an SS block index for the CSI-RS may not be additionally signaled.

In the present invention, if it is desired to perform spatial acquisition by forming a connection relation between an SS block index and a CSI-RS index, this means that quasi co-location (QCL) is assumed between different signals. Hereinafter, association between the CSI-RS and the SS block may be referred to as QCL or connection relationship configuration. Examples of specific parameters for QCL are as follows.

Average Angle (AA):

In terms of AA, QCL between antenna ports may mean that it is possible to configure received beam directions (and/or received beam widths/sweeping degrees) equally or similarly (in association therewith) and to perform reception processing, between antenna ports in which QCL is guaranteed, for example, when a receiving device desires to receive signals transmitted through other antenna port(s) based on AA estimated from specific antenna port(s) (this means that reception performance when the receiving device operates in this way is guaranteed at a specific level or more).

AA may represent, for example, "(almost) dominant arrival angle". In other words, QCL between antenna ports in terms of AA may mean that, when a specific dominant (arrival) angle S of a signal measured from a specific antenna port is present, a specific dominant (arrival) angle of a signal measured from another antenna port with which the specific antenna port is assumed to be QCLed is "almost" similar to the specific dominant (arrival) angle S. That is, when such a QCL assumption can be made, this means that a receiver may use/apply AA estimated from a specifically indicated QCLed RS/SS to perform reception processing "almost" equally so that there is an advantage of carrying out efficient receiver implementation/operation.

Angular Spread (AS):

In terms of AS, QCL between two antenna ports means that AS estimated from one antenna port may be derived/estimated/applied from AS estimated from another antenna port. In this case, AS indicates azimuth and/or zenith AS and may be separately defined in each specific dimension or may be defined together with the specific dimension. In addition, AS may be defined separately or together in terms of departure and/or arrival.

In terms of AA, QCL between antenna may mean that it is possible to configure received beam widths/sweeping degrees (and/or received beam directions) equally or similarly (in association therewidth) and to perform reception processing, between antenna ports in which QCL is guaranteed, for example, when it is desired to receive signals transmitted through other antenna port(s) based on AS estimated from specific antenna port(s) (this means that reception performance in such an operation is guaranteed at a specific level or more). That is, AA characteristically means an average, (most) valid/dominant beam direction, whereas AS may be interpreted as a parameter regarding how far a beam direction is spread and received by a radiator distribution (centering upon/based on AA) and then is received.

To distinguish between RSs used for L3 mobility and perform operation of the UE, the present invention proposes the following schemes. In an NR system, an RRM operation of the UE differs according to whether the number of SS blocks is one or plural, i.e., according to whether transmission is single-beam based PSS/SSS transmission or multi-beam based PSS/SSS transmission. Hereinafter, SS block RSRP or SSS RSRP may be understood as the same meaning. In the present invention, cell-level RRM means cell quality representative of a specific cell and beam-level RRM means beam quality indicating quality of each beam.

Scheme 1)
Case of single SS block
Cell-level RRM (for L3 Mobility): SSS RSRP is representative of cell quality.
Beam (or TRP)-level RRM: RRM is performed using CSI-RS RSRP.
Case of multiple SS blocks
Cell-level RRM (for L3 mobility): SSS RSRP is used and cell-Level RRM value is derived/calculated by combining a plurality of SSS RSRPs (or using a function of a plurality of SSS RSRPs).
Beam-level RRM: use of SSS RSRP The network informs the UE of whether a corresponding cell operates in a single SS block or multiple SS blocks. If an RRM measurement target cell operates in a single beam, i.e., if a single SS block is present in the measurement target cell, the UE performs a cell-level RRM operation using one SSS and performs CSI-RS based beam-level or TRP-level RRM according to CSI-RS configuration information based measurement for RRM in CONNECTED mode. While the UE measures/tracks a corresponding CSI-RS, if an event that should report a measurement result occurs, the UE reports the measurement result to the network. If multiple SS blocks are transmitted in a cell, the UE may derive/calculate a cell-level RRM value by combining SSS RSRPs for respective SS blocks and report the cell-level RRM value. The UE may measure/report the SSS RSRPs for the purpose of beam-level RRM.

When the gNB transmits multiple SS blocks, the UE calculates a cell-level RRM value using a plurality of SSS RSRPs according to a window/filtering coefficient given to calculate the cell-level RRM value. If SS block RSRP exceeds a specific threshold and a defined specific event occurs, the UE reports a measurement result for the SSS RSRP to the network.

Even for neighboring cell measurement, the network informs the UE of information as to whether the neighboring cell uses a single SS block or multiple SS blocks. The network signals, to the UE, which RS should be used for cell-level RRM and beam-level RRM of the neighboring cell when the UE performs measurement for the neighboring cell. When multiple SS blocks are transmitted in a cell, the UE may calculate the cell-level RRM value of the neighboring cell according to the scheme of calculating the above-described cell-level RRM quantity and use the calculated cell-level RRM value for cell selection/reselection. According to whether the neighboring cell transmits a single SS block or multiple SS blocks, an operation and an RS for performing RRM measurement per cell by the UE differ.

If multiple SS blocks are configured, the above-described plural options may be considered for beam-level RRM. Although the UE calculates/reports one cell-level RRM value by combining a plurality of RSs used for cell-level RRM, the UE reports, for beam-level RRM, RSRP for a corresponding RS if a measurement reporting event for an RS having RSRP of a predetermined threshold or more is triggered.

Scheme 2)
Case of single SS block
Cell-level RRM(for L3 mobility): SSS RSRP is representative of cell quality.
Beam(or TRP)-level RRM: RRM is performed using one or more CSI-RS RSRPs.
Case of multiple SS blocks
Cell-level RRM (for L3 mobility): SSS RSRP is used and a cell-Level RRM value is derived/calculated by combining a plurality of SSS RSRPs (or using a function of a plurality of SSS RSRPs).
Beam-level RRM: Which RS will be used for measurement per beam may be determined by network signaling.
Alt 1: Use of SSS RSRP. RSRP per SS block is measured and reported.
Alt 2: Use of CSI-RS RSRP. RSRP per CSI-RS is measured and reported. However, if CSI-RS RSRP is used and the CSI-RS RSRP is reported as an RSRP report per beam, SS block RSRP of an SS block index connected to or QCLed with a corresponding CSI-RS, i.e., an SSS RSRP value, is also reported.

The network informs the UE of whether a corresponding cell operates in a single SS block or multiple SS blocks. In both the single SS block and the multiple SS blocks, even if the UE enters CONNECTED mode, the UE may receive CSI-RS configuration related information. If an RRM measurement target cell operates in a single beam, i.e., if a single SS block is present in the measurement target cell, the UE performs a cell-level RRM operation using one SSS and performs CSI-RS based beam-level or TRP-level RRM according to CSI-RS configuration information based measurement for CSI-RS based measurement. While the UE measures/tracks a corresponding CSI-RS, if an event that should report a measurement result occurs, the UE reports the measurement result to the network. If multiple SS blocks are transmitted in a cell, the UE may derive/calculate a cell-level RRM value by combining SSS RSRPs for respective SS blocks.

SSS RSRP or CSI-RS RSRP may be used for beam-level RRM. Which RS is used to perform RRM may be determined according to the radio resource control (RRC) state of the UE, according to a configured RS type, or by specific signaling. When RRM measurement is performed for multiple cells in a multi-cell environment, if an RS used for RRM measurement differs per cell, consideration of a measurement event is needed. For example, when the network configures cell A to perform RRM measurement using an SSS and cell B to perform RRM measurement using a CSI-RS, if the UE needs to report measurement due to occurrence of a specific event while the UE performs measurement for a serving cell and a neighboring cell, a sort of offset value needs to be configured to trigger the measurement reporting event. If the measurement reporting event, e.g., a serving cell RRM value, is defined as a value lower than an RRM value of a specific cell by a predetermined dB or more and the UE is configured to perform cell-level RRM based on the CSI-RS with respect to the serving cell and perform cell-level RRM based on the SSS with respect to the neighboring cell, CSI-RS RSRP is generally transmitted with a narrower beam even when RSRP values are equal. Therefore, it is predictable that the neighboring cell will actually be served with better quality. Accordingly, it is better that SSS RSRP be compared with CSI-RS RSRP by being added to a predetermined offset relative to the CSI-RS RSRP. This offset may be considered in the measurement reporting event or the network may consider the offset to compare RRM. However, for accurate operation, the offset may desirably be considered in the measurement reporting event.

If the gNB transmits multiple SS blocks (on the cell), the UE calculates a cell-level RRM value using a plurality of RSRPs according to a window/filtering coefficient used to calculate the cell-level RRM value. If a specific event occurs for SSS RSRP exceeding a specific threshold, the UE reports a measurement result for the SSS RSRP to the network. If a CSI-RS is configured to be used for beam-level measurement, the UE reports CSI-RS RSRP for the event. The event for triggering a CSI-RS RSRP report may have a predetermined offset as compared with an event for triggering the SSS RSRP report.

Even for neighboring cell measurement, the network informs the UE of information as to whether the neighboring cell uses a single SS block or multiple SS blocks. According to whether the neighboring cell uses a single SS block or multiple SS blocks, an operation and an RS for performing RRM measurement per cell by the UE differ.

If multiple SS blocks are configured, the above-described plural options may be considered for beam-level RRM. Although the UE calculates/reports one cell-level RRM value by combining a plurality of RSs used for cell-level RRM, the UE may be configured to report, for beam-level RRM, RSRP for a corresponding RS if a measurement reporting event for an RS having RSRP of a predetermined threshold or more is triggered.

SSS RSRP may be used for beam-level RRM. Upon performing beam-level RRM using an SSS, the UE reports an SSS value having a threshold or more to the network.

Alternatively, as mentioned above, the UE may measure, for beam-level RRM, a plurality of CSI-RS RSRPs and report a measurement result. When RSRP using the CSI-RS is measured, an association relationship between the CSI-RS and the SSS (i.e., SS block index) is configured as described above. A specific cell (or the specific gNB) may configure one or more CSI-RSs connected to each SS block of the cell, for beam-level RRM. For beam-level RRM, if a measurement reporting event for a CSI-RS having RSRP of a predetermined threshold or more is triggered, the UE reports RSRP for the CSI-RS. However, if RSs used for beam-level RRM of different cells differ, for example, if the CSI-RS is used for beam-level RRM of a serving cell and SSS RSRP (SS block RSRP) is used for beam-level RRM of a neighboring cell, the UE may consider a predetermined offset added to the SSS RSRP upon comparison with received RSRP. For example, such consideration may be given with respect to a measurement reporting event. Further, when the network calculates RSRPs reported by the UE, the network may estimate beam quality and interference in consideration of this offset. As another scheme, when beam-level RRM is performed using the CSI-RS and the UE reports CSI-RS RSRP, the UE may also report SS block RSRP for an SS block index associated or QCLed with a corresponding CSI-RS. In this case, the UE may directly report an SS block RSRP value or may report a difference (+/- k dB) as compared with RSRP of a CSI-RS to be reported as the SS block RSRP value.

Although a plurality of CSI-RSs may be connected to each SS block, a CSI-RS that the UE should report may be representative of one RSRP per SS block. That is, although the UE reports CSI-RS RSRP, since each CSI-RS is connected to a specific SS block, a CSI-RS RSRP report may be representative of RSRP for an SS block connected to a corresponding CSI-RS.

As another scheme, the network may inform the UE of an RS to be used for beam-level RRM. Beam-level RRM using the CSI-RS may be performed only after the UE receives configuration information and measurement configuration information for the CSI-RS. Therefore, RRM measurement may be performed using one or more SSSs as a default operation for beam-level RRM. Upon receiving a CSI-RS configuration and a beam-level RRM command using the CSI-RS, the UE performs beam-level RRM using a designated RS. If an RS to be used varies (e.g., beam-level RRM using the CSI-RS is performed after an SSS is used), the UE resets all existing measurement values and performs measurement using the designated RS. However, if an association relationship (e.g., QCL) is configured between the designated RS (e.g., CSI-RS) and an RS (e.g., SSS) for which measurement has already been performed, the UE may perform measurement by reusing a measurement value for the RS (e.g., SSS) having a configured association relationship with the designated RS (e.g. CSI-RS). If it is desired to reuse a measurement value caused by a previous RS, information indicating how much offset or difference from SS block RSRP should be considered for CSI-RS RSRP may be signaled by the network. To cause the network to determine the offset, the UE may report information about an average difference between SS block RSRP and CSI-RS RSRP based on a value measured thereby to the network.

To reduce measurement complexity, although beam-level RRM is performed using the CSI-RS for a serving cell, beam-level RRM for a neighboring cell may be limited to use SS block RSRP.

If the mode of the UE is switched, an RS for beam-level RRM may be changed. For example, in IDLE mode or INACTIVE mode, measurement for a relatively wide beam is performed using an SSS, whereas, in CONNECTED mode, beam-level RRM may be performed using a CSI-RS having a narrower beam width than the SSS. However, for cell-level RRM, the same RS may be used regardless of mode switching of the UE.

Scheme 3)
  Case of single SS block
    Cell-level RRM (for L3 mobility): SSS RSRP is representative of cell quality.
    Beam (or TRP)-level RRM: RRM is performed using one or more CSI-RS RSRPs.

Case of multiple SS blocks
  Cell-level RRM (for L3 mobility)
    Alt 1: SSS RSRP is used and a cell-level RRM value is derived/calculated by combining a plurality of SSS RSRPs (or using a function of a plurality of SSS RSRPs).
    Alt 2: CSI-RS RSRP is used and cell-level RRM value is derived/calculated by combining a plurality of CSI-RS RSRPs (or using a function of CSI-RS RSRPs).
    In case of cell-level RRM, the UE may calculate a cell quality value derived from two types of RSs according to network configuration. In this case, a measurement reporting event for cell selection/reselection/handover for each RS may be configured for the UE. However, the network/gNB may signal whether SSS RSRP will be used or CSI-RS RSRP will be used. According to which RS is used for L3 mobility, which RS will be used to calculate cell quality is determined. This may be determined according to the RRC state of the UE. For example:
  In IDLE mode, since only SS block RSRP is used, the UE calculates cell quality using the SS block RSRP and performs a cell selection operation using the SS block RSRP.
  In CONNECTED mode, RRM may be performed using the CSI-RS RSRP together with the SS block RSRP and cell quality is calculated using RS used for measurement. When both types of RS are measured, two types of cell quality may be calculated using the SS block RSRP and the CSI-RS RSRP. By network signaling, the UE may be configured to perform RRM measurement using only one type of RS. When RRM measurement is performed using only one type of RS, the UE derives one cell quality using only the RS signaled by the network. Alternatively, even when RRM measurement is performed using two types of RSs, the network may command the UE to derive cell quality by indicating a specific RS.
  In INACTIVE mode, measurement for both the SS block and the CSI-RS may be a burden in terms of power consumption of the UE. Accordingly, the network may signal which RS should be used to perform RRM before the UE enters INACTIVE mode. The UE measures cell quality using the signaled RS in INACTIVE mode.
  Beam-level RRM: For measurement per beam, which RS will be used may be determined by network signaling.
    Alt 1: SSS RSRP is used and a default RS for beam-level RRM of the UE in NR is the SSS RSRP. The SSS RSRP may be used in all of IDLE, INACTIVE, and CONNECTED modes and beam-level RRM of the UE uses the SSS RSRP until an additional CSI-RS is configured.
    Alt 2: CSI-RS RSRP is used. RRM measurement using the CSI-RS refers mainly to measurement in the CONNECTED mode. During RRM measurement using the CSI-RS, it may be assumed that measurement for an SS block is basically performed. If a CSI-RS configuration and a measurement event for L3 mobility are configured, the UE performs beam-level RRM using the CSI-RS RSRP. However, when the CSI-RS RSRP is used and the CSI-RS RSRP is reported as a RSRP report per beam, SS block RSRP of an SS block index connected to a corresponding CSI-RS, i.e., an SSS RSRP value, is also reported. If a CSI-RS index is connected to an SS block index, this means that the UE may get help from the SS block index in acquiring spatial information of the CSI-RS. Accordingly, as mentioned above, if a specific CSI-RS is connected to a specific SS block and the UE receives signaling regarding this connection, the UE may report RSRP for the corresponding SS block when reporting RSRP for the CSI-RS. If there is no special connection/association relationship between the CSI-RS and the SS block, the UE reports only the CSI-RS RSRP. During RSRP reporting of a CSI-RS with which a specific SS block has a connection relationship, whether the UE will report RSRP for the SS block may be determined by network signaling. For example, if the network signals that the SS block RSRP should also be reported to the UE, the UE reports RSRP for an SS block connected to the CSI-RS as well while reporting the CSI-RS RSRP. If there is no additional signaling or only the CSI-RS RSRP is signaled to the UE, the UE reports only the CSI-RS RSRP.

The network informs the UE of whether a corresponding cell operates in a single SS block or multiple SS blocks. Even if the UE enters CONNECTED mode, the UE may receive CSI-RS configuration related information in both a single SS block and in multiple SS blocks. If an RRM measurement target cell operates as a single beam, i.e., if the single SS block is present in the measurement target cell, the UE performs a cell-level RRM operation using one SSS and performs CSI-RS based beam-level or TRP-level RRM according to CSI-RS configuration information based measurement for CSI-RS based measurement. If an event for reporting a measurement result occurs while measuring/tracking a corresponding CSI-RS, the UE reports the measurement result to the network.

Hereinafter, the above-described cell-level RRM and beam-level RRM will be described in more detail.

Cell-Level RRM

A scheme of calculating a cell-level RRM value is similar to the above-described "cell-level RRM quantity" part. In the case of a single SS block, although one SSS RSRP is used for cell-level RRM (i.e., a single SS block RSRP is used as cell quality), use of a CSI-RS for cell-level RRM is burdened. When multiple SS blocks are configured, RS options used for cell-level RRM include a scheme of using multiple SSSs or a scheme of using multiple CSI-RSs. Whether to use an SSS or a CSI-RS may be designated through network signaling.

When use of a CSI-RS is considered for RRM measurement, RSs for DL measurement in CONNECTED mode are hierarchical as three levels: cell ID—SS block index—CSI-RS index. It is not clear yet whether the cell-level RSRP quantity can be derived using a CSI-RS in CONNECTED mode and which quantity(s) should be reported during CONNECTED mode per triggered event. The UE may report SS block RSRP and also report CSI-RS based RSRP for each triggered event in the CONNECTED mode. However, which RS will be used to derive cell-level RSRP for cell selection/reselection, i.e., whether cell-level RSRP will be derived using an SSS or a CSI-RS or two cell-level RSRPs will be derived using both the SSS and the CSI-RS has not been determined yet. In either case, the UE uses the SS block RSRP using the SSS in IDLE mode.

In RRC CONNECTED mode, it may be natural to use the same DL RS in a cell selection/reselection procedure and a handover procedure. If a DL RS for cell selection/reselection is different from a DL RS for handover, time-domain processing for cell-level RRM measurement may be complicated. For example, when an RRC state is switched from RRC IDLE mode to RRC CONNECTED mode or vice versa and a DL RS type for cell-level RRM measurement is changed, the UE may need to initialize previous cell-level RRM measurement that may be calculated using time-domain averaging. This is undesirable because acquisition of cell-level RRM measurement for handover in CONNECTED mode may be delayed and it is not guaranteed that RSRPs of other RSs always have the same tendency with respect to a plurality of cells. Therefore, if there are no clear benefits to use a DL RS for cell selection/reselection and other DL RSs for handover, it is better to use the same DL RS for cell-level measurement (i.e., cell selection/reselection, handover) in both RRC IDLE mode and RRC CONNECTED mode.

For the above-described reasons, it is desirable to use an SSS per SS block, rather than a CSI-RS, for cell-level RRM. However, if cell-level RRM using the CSI-RS is needed in the CONNECTED mode for a serving cell, SS block based cell-level RRM which has been used in IDLE mode needs to be properly converted into CSI-RS based cell-level RSRP. Simply, a CSI-RS based RRM measurement value may be calculated by setting a predetermined offset from an SS block based cell-level RRM measurement value. When the CSI-RS is used, specific CSI-RS RSRP may represent an RSRP value for a specific SS block. However, for the above-described reasons, since using the CSI-RS for cell-level RRM for a neighboring cell may has a probability of making a system too complicated, it may be desirable to use SS-block RSRP for cell-level RRM for the neighboring cell.

When multiple SS blocks are transmitted on a cell and an RS used for L3 mobility (i.e., cell-level RRM) varies according to the RRC state of the UE, this needs to be considered. In IDLE mode, since SS block RSRP is used for L3 mobility, the UE/network calculates cell quality using the SS block RSRP without any other choice.

After establishing RRC connection with the network or the gNB, the UE may perform RRM using the CSI-RS in CONNECTED mode. In the CONNECTED mode, the UE performs cell detection upon a neighboring cell based on an SS block, acquires timing and frequency of the corresponding cell based on the SS block, and performs RRM using CSI-RS using the timing and frequency. That is, the UE should perform RSRP measurement upon the SS block as well as the CSI-RS RSRP and cell quality is also derived using each RS. That is, the UE calculates both SS block based cell quality and CSI-RS based cell quality.

A measurement reporting event for cell selection/reselection may be defined with respect to each of the SS block RSRP and the CSI-RS RSRP. For example, if $C_{serving\_SS\_block} > C_{i\_SS}$ block$+D_{offset\_SS\_block}$, the UE reports $C_{serving\_CSI-RS}$ and $C_{i\_CSI-RS}$ together with $C_{serving\_SS\_block}$, and $C_{i\_SS\_block}$. Herein, meaning of each symbol is as follows and $D_{offset\_SS\_block}$ may be a constant of a predetermined value:

$C_{serving\_SS\_block}$: SS block based cell quality of a serving cell, $C_{i\_SS\_block}$: SS block based cell quality of an i-th neighboring cell, $C_{serving\_CSI-RS}$: CSI-RS based cell quality of a serving cell, $C_{i\_CSI-RS}$ based cell quality of an i-th neighboring cell.

In contrast, a corresponding event may occur by CSI-RS based cell quality. That is, if $C_{servin\_CSI-RS} > C_{i\_CSI-RS} + D_{offset\_CSI-RS}$, the UE reports $C_{serving\_SS\_block}$ and $C_{i\_SS\_block}$ together with $C_{serving\_CSI-RS}$ and $C_{i\_CSI-RS}$. Herein, $D_{offset\_CSI-RS}$ may be a constant of a predetermined value.

If a cell quality based measurement reporting event is triggered, not only cell quality measurement but also RSRP results of the RSs measured by a corresponding UE are reported. For example, the best N SS block RSRPs and the best M CSI-RS RSRPs are reported together. N and M may have different values and N and M corresponding to a serving cell and N and M corresponding to a neighboring cell may differ. That is, when a measurement reporting event for SS block RSRP based cell quality is triggered, information that the UE should report is as follows.

SS block RSRP based cell quality of a detected neighboring cell and best N' SS block RSRPs and respective SS block indexes of the neighboring cell, and/or (SS block RSRP based) serving cell quality and best N" SS block RSRPs and respective SS block indexes of a serving cell.

Additionally:

best M' CSI-RS RSRPs and respective CSI-RS indexes of the detected neighboring cell, and/or best M" CSI-RS RSRPs and respective CSI-RS indexes of a serving cell, and/or whether to report CSI-RS RSRPs and cell quality derived from CSI-RS RSRP may be determined by network signaling and all of N', N", M', and M" are configurable.

If a measurement reporting event for CSI-RS RSRP based cell quality is triggered, information that the UE should report may be as follows.

CSI-RS RSRP based cell quality of a detected neighboring cell and best N' CSI-RS RSRPs and respective CSI-RS indexes of the neighboring cell, and/or (CSI-RS RSRP based) serving cell quality and best N" CSI-RS RSRPs and respective CSI-RS indexes of a serving cell.

Additionally:

best M' SS block RSRPs and respective SS block indexes of the detected neighboring cell, and/or best M" SS block RSRPs and respective SS block indexes of a serving cell, and/or Whether to report SS block RSRPs and cell quality derived from SS block RSRP may be determined by network signaling and all of N', N", M', and M" are configurable.

Among RRC states, INACTIVE mode may be understood as an intermediate state of IDLE mode and CONNECTED mode. Whether to perform RRM in INACTIVE mode using the same scheme as that in IDLE mode or as that in CONNECTED mode may be signaled by the network.

Beam-Level RRM

Even for beam-level RRM, options similar to the above-described options may be considered. However, when RRM measurement is performed for multiple cells in a multi-cell environment, if a used RS differs per cell, consideration of a measurement event is needed. For example, when the network configures cell A to perform RRM measurement using an SSS and cell B to perform RRM measurement using a CSI-RS, if the UE needs to report measurement due to occurrence of a specific event while the UE performs measurement for a serving cell and a neighboring cell, a sort of offset value needs to be configured to trigger the measurement reporting event. If the measurement reporting event, e.g., a serving cell RRM value, is defined as a value lower than an RRM value of a specific cell by a predetermined dB or more and the UE is configured to perform cell-level RRM based on the CSI-RS with respect to the serving cell and perform cell-level RRM based on the SSS with respect to the neighboring cell, CSI-RS RSRP is generally transmitted with a narrower beam even when RSRP values are equal. Therefore, it is predictable that the neighboring cell will actually be served with better quality. Accordingly, it is better that SSS RSRP be compared with CSI-RS RSRP by being added to a predetermined offset relative to the CSI-RS RSRP. This offset may be considered in the measurement reporting event or the network may consider the offset to compare RRM. However, for accurate operation, the offset may desirably be considered in the measurement reporting event.

If the gNB transmits multiple SS blocks (on the cell), the UE calculates a cell-level RRM value using a plurality of RSRPs according to a window/filtering coefficient given to calculate the cell-level RRM value. If a specific event occurs for a cell-level RRM RS exceeding a specific threshold, the UE reports a measurement result for the RS to the network.

Even for neighboring cell measurement, the network informs the UE of information as to whether the neighboring cell uses a single SS block or multiple SS blocks. According to whether the neighboring cell uses a single SS block or multiple SS blocks, an operation and an RS for performing RRM measurement per cell by the UE differ.

If multiple SS blocks are configured, the above-described plural options may be considered for beam-level RRM. Although the UE calculates/reports one cell-level RRM value by combining a plurality of RSs used for cell-level RRM, the UE may be configured to report, for beam-level RRM, RSRP for a corresponding RS if a measurement reporting event for an RS having RSRP of a predetermined threshold or more is triggered.

SSS RSRP may be used for beam-level RRM. This is associated with cell-level RRM. If an SSS is used for cell-level RRM, the SSS or a CSI-RS may be used for beam-level RRM. However, if the CSI-RS is used for cell-level RRM, use of the SSS for beam-level RRM is burdened. Rather, beam-level RRM may be automatically performed using the CSI-RS. Upon performing beam-level RRM using the SSS, the UE reports an SSS value having a threshold or more to the network.

Alternatively, as mentioned above, the UE may measure, for beam-level RRM, a plurality of CSI-RS RSRPs and report a measurement result. When RSRP using the CSI-RS is measured, an association relationship between the CSI-RS and the SSS (i.e., SS block index) may be configured first as described above. A specific cell (or a gNB of the specific gNB) may configure one or more CSI-RSs connected to each SS block, for beam-level RRM. For beam-level RRM, if a measurement reporting event for a CSI-RS having RSRP of a predetermined threshold or more is triggered, the UE reports RSRP for the CSI-RS. If an SS block connected to a corresponding CSI-RS is previously signaled, the UE may report SS block RSRP connected to the CSI-RS while reporting CSI-RS RSRP. It is apparent that whether the UE should also report the SS block RSRP connected to the CSI-RS may be determined by network signaling. However, if there is no SS block connected to the CSI-RS, the UE reports only the CSI-RS RSRP. Herein, if RSs used for beam-level RRM of different cells differ, for example, if the CSI-RS is used for beam-level RRM of a serving cell and SSS RSRP (SS block RSRP) is used for beam-level RRM of a neighboring cell, the UE may consider a predetermined offset (x dB) added to the SSS RSRP upon comparison with received RSRP. Such consideration may be given in a measurement reporting event. Further, the network may estimate beam quality and interference in consideration of this offset.

Although a plurality of CSI-RSs is connected to each SS block, a CSI-RS that the UE should report may be represented as one per SS block. That is, although the UE reports CSI-RS RSRP, since each CSI-RS is connected to a specific SS block, a CSI-RS RSRP report may be representative of RSRP for an SS block connected to a corresponding CSI-RS.

As another scheme, the network may inform the UE of an RS to be used for beam-level RRM. Beam-level RRM using the CSI-RS may be performed only after the UE receives configuration information and measurement configuration information for the CSI-RS. Therefore, RRM measurement may be performed using one or more SSSs as a default operation for beam-level RRM. Upon receiving a CSI-RS configuration and a beam-level RRM command using the CSI-RS, the UE performs beam-level RRM using a designated RS. If an RS to be used varies (e.g., beam-level RRM using the CSI-RS is performed after an SSS is used), the UE resets all existing measurement values and performs measurement using the designated RS. However, if an association relationship (e.g., QCL) is configured between the designated RS (e.g., CSI-RS) and an RS (e.g., SSS) for which measurement has already been performed, the UE may perform measurement by reusing a measurement value for the RS (e.g., SSS) having a configured association relationship with the designated RS (e.g. CSI-RS). If beam-level RRM is measured using the CSI-RS, the UE may be configured to report SS block RSRP for an SS block index as well, which is associated or QCLed with the CSI-RS, when reporting CSI-RS RSRP. In this case, the UE may directly report an SS block RSRP value or may report a difference (+/− k dB) as compared with RSRP of a CSI-RS to be reported as the SS block RSRP value.

To reduce measurement complexity, although beam-level RRM is performed using the CSI-RS for a serving cell, beam-level RRM for a neighboring cell may be limited to use SS block RSRP.

If the mode of the UE is switched, an RS for beam-level RRM may be changed. For example, in IDLE mode or INACTIVE mode, measurement for a relatively wide beam is performed using an SSS, whereas, in CONNECTED mode, beam-level RRM may be performed using a CSI-RS having a narrower beam width than the SSS. However, for cell-level RRM, the same RS may be used regardless of mode switching of the UE.

<CSI-RS Configuration for RRM>

In CONNECTED mode, a CSI-RS may be used for DL measurement in addition to an SSS. There may be multiple SS blocks for producing multiple SS block RSRPs and multiple CSI-RSs may be configured per SS block. Since the UE continues to track CSI-RS based RSRP as well as SS block RSRP during CONNECTED mode, a relationship between the SS block RSRP and the CSI-RS based RSRP may be helpful to the UE. After the UE is connected to the network, the UE should be provided with CSI-RS configurations and information about QCL for each CSI process may be provided to the UE. There may be multiple CSI-RS configurations per SS block RSRP measurement. That is, each CSI-RS may be partially QCLed with a specific SS block index. If the network configures measurements for CONNECTED mode, the UE measures CSI-RSs included in measurement configurations. The CSI-RS configurations may be not cell-specific but UE-specific. The UE may simply estimate the CSI-RS using QCL information.

Even if RRM measurement is performed using the CSI-RS, synchronization for timing and frequency of a serving or neighboring cell is based on an SS block. However, as described above, when a specific SS block index may be used for synchronization acquisition for a space for the CSI-RS, i.e., the UE may get help from a beam of the SS block in searching for a beam of the CSI-RS, the network signals an association relationship between a specific CSI-RS and a specific SS block index. When transmission beam widths of the SS block and the CSI-RS are considered, multiple CSI-RSs may be present within a beam width covered by one SS block. From this point of view, a plurality of CSI-RSs may be connected to one SS block. That is, multiple CSI-RSs may be transmitted within a beam width of one SS block and each CSI-RS is defined only in a space limited to the transmission beam width of the SS block. Therefore, if the network informs the UE of an SS block index connected to the CSI-RS among SS blocks of a cell in which the CSI-RS is present in a CSI-RS configuration, the UE may be previously aware that CSI-RS(s) will be transmitted only in a direction in which the SS block having an indicated SS block index is transmitted.

In the present invention, if the UE receives help from the SS block to measure the CSI-RS, this means that accuracy of the SS block, when the SS block is more frequently transmitted than the CSI-RS, is used to measure the CSI-RS. However, in NR, if a transmission period of the SS block is more sparsely configured, i.e., if the CSI-RS is more frequently transmitted than the SS block, there is no reason that the CSI-RS receives help from the SS block. When multiple TRPs are present in one cell and a specific TRP transmits the CSI-RS but does not transmit the SS block, QCL information between the CSI-RS and the SS block may not be configured. Therefore, when the gNB informs the UE of CSI-RS information, the gNB informs the UE of an SS block index when the CSI-RS is QCLed with the SS block and may not include information about the SS block index in the CSI-RS information when the QCL information is not configured.

Measurements of Serving/Neighboring Cell

In CONNECTED mode, RRM measurements include serving cell measurement and neighboring cell measurement which may be different operations in terms of the UE. For serving cell measurement, fine beam measurements may be needed to determine a serving beam from a serving cell. RAN1 has determined definition of SS block RSRP for RRM measurement during IDLE mode. After the UE is connected to the network, the UE should be provided with CSI-RS configurations and QCL information for each CSI process may be provided to the UE. There may be multiple CSI-RS configurations per SS block RSRP measurement. That is, each CSI-RS may be partially QCLed with a specific SS block index. If the network configures measurements for CONNECTED mode, the UE measures CSI-RSs included in a measurement command. The CSI-RS configurations may not be cell-specific but UE-specific. The UE may simply estimate the CSI-RS using QCL information and an SS block index may be a serving cell index or a neighboring cell index of CSI-RS. Due to this configuration, whether measurement is for the serving cell or for the neighboring cell may be transparent to the UE.

In other words, one or more SS blocks connected to a cell ID may be present. Multiple CSI-RSs connected to each SS block may be defined. If the SS block is connected to the CSI-RS, this means that the SS block and the CSI-RS has a QCL relationship or a partial QCL relationship. QCL indicates that characteristics of a specific signal are partially similar. The network establishes a QCL relationship between different RSs so that the UE may get help from another RS during time/frequency/spatial synchronization acquisition using a specific RS. In the present invention, QCL between the CSI-RS and the SS block is mainly an association relationship in the spatial domain and detailed parameters have been described above.

It is expected that there are multiple SS blocks per cell and more CSI-RSs than the number of SS blocks in each cell will be transmitted per cell. Therefore, if the network/gNB transmits all information including CSI-RS configuration information for a neighboring cell to each UE, this may be very large overhead in terms of DL resource efficiency. Accordingly, a method of effectively transmitting the CSI-RS configuration information to the UE is needed. First, it is not difficult for the network/gNB to signal a full configuration for the CSI-RS to a serving cell. In addition, it may not be difficult for the network/gNB to transmit CSI-RS configuration information regarding a partially limited number and a limited number of CSI-RSs to the UE with overhead similar to LTE. It is not easy to predict candidate CSI-RS information needed to perform RRM due to extension of the number of antennas and the number of beams. The present invention proposes that the UE request a CSI-RS configuration of a neighboring cell based on a specific event and receive the CSI-RS configuration from the network/gNB. Basically, the UE should perform measurement for an SS block and may detect a specific cell through measurement for the SS block. For example, if a value for a specific SS block, measured by the UE, is equal to or greater than a predetermined value, the UE may request a CSI-RS configuration of a corresponding cell. If the SS block RSRP is equal to or greater than a predetermined value or is measured as a value within a certain range as compared with a serving cell of the UE and the UE fails to receive CSI-RS configuration information for a corresponding cell or the CSI-RS configuration information which has already been received and known to the UE is very limited, the UE requests the CSI-RS configuration information to the network. Simply, similarly to an on-demand system information request scheme, the UE may transmit a random access channel (RACH) or a scheduling request (SR) in the sense of requesting a CSI-RS configuration. In this case, the CSI-RS configuration information may be transmitted as a system information block (SIB). Alternatively, the case in which a cell has been detected but the CSI-RS configuration information of the cell is not present or is very limited may be defined as one measurement event. In other words, a condition for triggering the measurement event may be the case in which SS block RSRP of a corresponding cell is equal to or greater than a predetermined value or the difference with the SS block RSRP of a serving cell is measured within a certain range. If the SS block RSRP of the corresponding cell is equal to or greater than a predetermined value or if the difference with the SS block RSRP of the serving cell is measured within a certain range, the UE reports the SS block RSRP for the corresponding cell. When reporting the SS block RSRP, the UE transmits an indication for requesting the CSI-RS information of the corresponding cell together with the SS block RSRP. The gNB receiving the SS block RSRP report including the indication transmits the CSI-RS configuration of a cell corresponding to a received SS block to the UE.

Although the UE detects and measures an SS block of a cell (other than a serving cell), if the cell is not included in a measurement target neighboring cell received by the UE (through, for example, MeasConfig) and the network has commanded the UE to perform CSI-RS based L3 mobility and configures only a CSI-RS based measurement event for the UE, a method in which the UE performs a report on a newly detected cell may not be proper. In this case, since the UE does not know a CSI-RS configuration for the corresponding cell at all, the UE may not perform measurement using a CSI-RS. Therefore, only for the corresponding cell, the UE performs beam-level and cell-level reports based on SS block RSRP. That is, while the UE performs CSI-RS RSRP based RRM, the UE may perform a report to the network as if SS block RSRP and SS block RSRP based cell quality are CSI-RS RSRP and CSI-RS RSRP based cell quality, with respect to a cell in which an SS block is detected although the UE is not aware of neighboring cell information and CSI-RS information.

Neighboring Cell Measurements for Inter-Cell/Beam Interference Coordination

Meanwhile, neighboring cell measurement in CONNECTED mode has another purpose, i.e., the purpose of inter-cell interference coordination. In order for the UE report or complain about the fact that a specific cell/beam interferes with the UE, the UE should measure interference per cell/beam. Since there are too many transmission beams of the gNB that the UE should measure in multiple cells, an interference quantity per transmission beam as well as received quality of a transmission beam of a neighboring cell acts as excessively large overhead with respect to the UE so that interference measurement per cell is not likely to be feasible. However, beam-level interference measurement has an advantage of deriving cell-level interference measurement. Herein, it is necessary to determine whether beam-level interference measurement is based on SS-block-RSRP per cell or on CSI-RS RSRP in CONNECTED mode.

Neighboring cell measurement having the purpose of achieving the possibility of beam switching or handover differs in operation from measurement having the purpose of inter-cell interference coordination (ICIC) or inter cell/beam interference coordination (IC/BIC). If it is desired to measure an effect of interference on a specific beam of a specific cell, the UE should measure an RS of a corresponding cell/beam while matching a received beam direction thereof to a serving beam. In other words, the UE may measure quality of a specific CSI-RS connected to/associated with a neighboring cell by performing reception beamforming in a direction of an SS block connected to the specific CSI-RS, i.e., in a direction of the neighboring cell. However, for interference measurement of the specific CSI-RS, the UE measures an interference quantity received from the specific CSI-RS in a state in which the UE performs reception beamforming in a direction of a serving beam (or serving CSI-RS) and/or a serving cell thereof. In this case, the specific CSI-RS corresponds to an interference measurement resource (IMR) in terms of ICIC measurement. An RS for interference measurement for the neighboring cell may be an SSS per SS block rather than a CSI-RS.

The network/gNB may signal two different parameters for neighboring cell measurement: 1) neighboring cell measurement set(s) for signal quality measurement of a neighboring cell, i.e., CSI-RS set(s), and 2) neighboring cell measurement set(s) for interference quantity measurement from the neighboring cell. Upon measuring a CSI-RS indicated as a measurement set for interference measurement, the UE performs measurement for the CSI-RS by performing reception beamforming in a direction of a specific beam (or a specific CSI-RS) of a serving cell. In this case, the UE may fix a received beam direction thereof in a direction of the serving cell. If it is desired to measure interference of another beam affecting the serving beam (or serving CSI-RS) thereof, the UE may fix a received beam at a specific beam (or non-serving CSI-RS) and measure a corresponding CSI-RS in order to measure the interference quantity from a specific beam (or a non-serving CSI-RS) of a specific neighboring cell.

As another scheme for obtaining the same effect as the effect described above, the network/gNB may equally signal a measurement set for neighboring cell measurement to UEs and differently configure a parameter for triggering an event for a measurement report according to a UE. The network/gNB may cause the UE to perform candidate serving cell measurement for the purpose of cell selection/reselection with respect to the same measurement set and designate the UE to report a measurement value for a candidate serving cell when the measurement value for the candidate serving cell is higher than a cell-level RRM value of a serving cell by x dB. For interference measurement for a neighboring cell, the UE may fix a received beam thereof in a direction of a serving cell beam and measure RSRP of a specific beam of a specific neighboring cell (i.e., RSRP of a specific CSI-RS of a neighboring cell). In this case, triggering conditions of a signal quality measurement report and an interference measurement report may be differently configured such that a report for corresponding interference measurement may be performed when a measurement value is higher than RSRP of the serving cell by y dB. In addition, the UE may make a report on whether a corresponding measurement report is about RSRP for a candidate serving cell or about RSRP measuring interference from a neighbor cell, together with the measurement report.

Although a neighboring cell measurement set signaled to measure the interference quantity actually corresponds to neighboring cell CSI-RSs, the network may inform the UE of the neighboring cell measurement set by faking the neighboring cell measurement set as if the neighboring cell measurement set is forcibly QCLed with a serving cell. In this case, the UE misunderstands the CSI-RSs such that the CSI-RSs are QCLed with the serving cell although the CSI-RSs are actually CSI-RSs of the neighboring cell and measures signal quality. As another scheme, the network/gNB may command the UE to perform interference measurement using a specific CSI-RS index configured for neighboring cell signal quality. In this case, the UE may perform interference measurement under the assumption that a corresponding CSI-RS is QCLed with the serving cell.

A neighboring cell signal quality result and an interference measurement result measured by the UE is reported to the network according to a network command.

Figure 6:
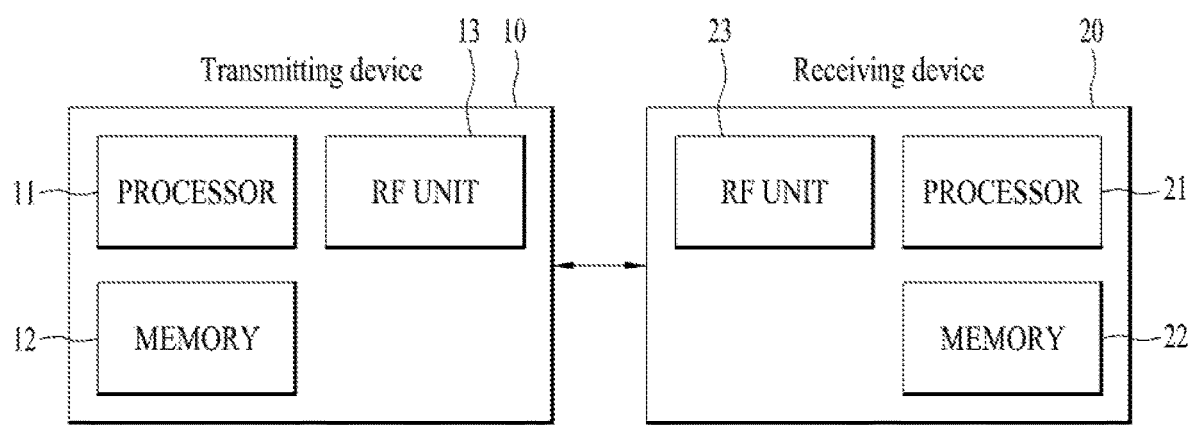
FIG. 6 is a block diagram illustrating elements of a transmitting device 10 and a receiving device 20 for implementing the present invention.

FIG. 6 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the present invention, the RF units 13 and 23 may support Rx BF and Tx BF. For example, in the present invention, the RF units 13 and 23 may be configured to perform the function illustrated in FIG. 2.

In the examples of the present invention, a UE operates as the transmitting device 10 in UL and as the receiving device 20 in DL. In the embodiments of the present invention, a gNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the gNB will be referred to as a gNB processor, a gNB RF unit, and a gNB memory, respectively.

The gNB processor may control the gNB RF unit to transmit the RRM measurement configuration information to the UE according to the present invention. The UE processor may control the UE RF unit to receive the RRM measurement configuration information and may perform RRM measurement according to the present invention based on the RRM measurement configuration information.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

The invention claimed is:

1. A method of performing measurement by a user equipment (UE) in a wireless communication system, the method comprising:
    transmitting a channel state information reference signal (CSI-RS) configuration request, based on a synchronization signal (SS) block of a cell which is not a serving cell (non-serving cell) for the UE;
    receiving a CSI-RS configuration for the cell, based on transmitting the CSI-RS configuration request;
    receiving a CSI-RS of the cell based on the CSI-RS configuration, the CSI-RS configuration including a SS block index that represents an SS block quasi co-located with the CSI-RS among a plurality of SS blocks of the cell; and
    performing radio resource management (RRM) measurement based on the CSI-RS and the SS block.

2. The method of claim 1, further comprising:
acquiring synchronization information for the CSI-RS based on the SS block, and
wherein the CSI-RS is received according to the synchronization information.

3. The method of claim 1, further comprising:
reporting a result of the RRM measurement.

4. The method of claim 1,
wherein, based on the RRM measurement being an interference measurement, the UE measures the CSI-RS while matching a received beam of the UE to a serving CSI-RS of the UE or a serving SS block of the UE.

5. A user equipment (UE) configured to perform measurement in a wireless communication system, the UE comprising,
a radio frequency (RF) transceiver,
a processor; and
a memory storing at least one program that causes the processor to perform operations comprising:
transmitting a channel state information reference signal (CSI-RS) configuration request, based on a synchronization signal (SS) block of a cell which is not a serving cell (non-serving cell) for the UE;
receiving a CSI-RS configuration for the cell, based on transmitting the CSI-RS configuration request;
receiving a CSI-RS of the cell based on the CSI-RS configuration, the CSI-RS configuration including a SS block index that represents an SS block quasi co-located with the CSI-RS among a plurality of SS blocks of the cell; and
performing radio resource management (RRM) measurement based on the CSI-RS.

6. The UE of claim 5, wherein the operations further comprise:
acquiring synchronization information of the CSI-RS based on the SS block, and
wherein the UE receives the CSI-RS according to the synchronization information.

7. The UE of claim 5, wherein the operations further comprise:
reporting a result of the RRM measurement.

8. The UE of claim 5,
wherein, based on the RRM measurement being an interference measurement, the UE measures the CSI-RS while matching a received beam of the RF transceiver to a serving CSI-RS of the UE or a serving SS block of the UE.

* * * * *